June 9, 1959   A. W. ANDERSON   2,889,675
MACHINE FOR COVERING CONTAINERS
Filed Oct. 9, 1957   6 Sheets-Sheet 2
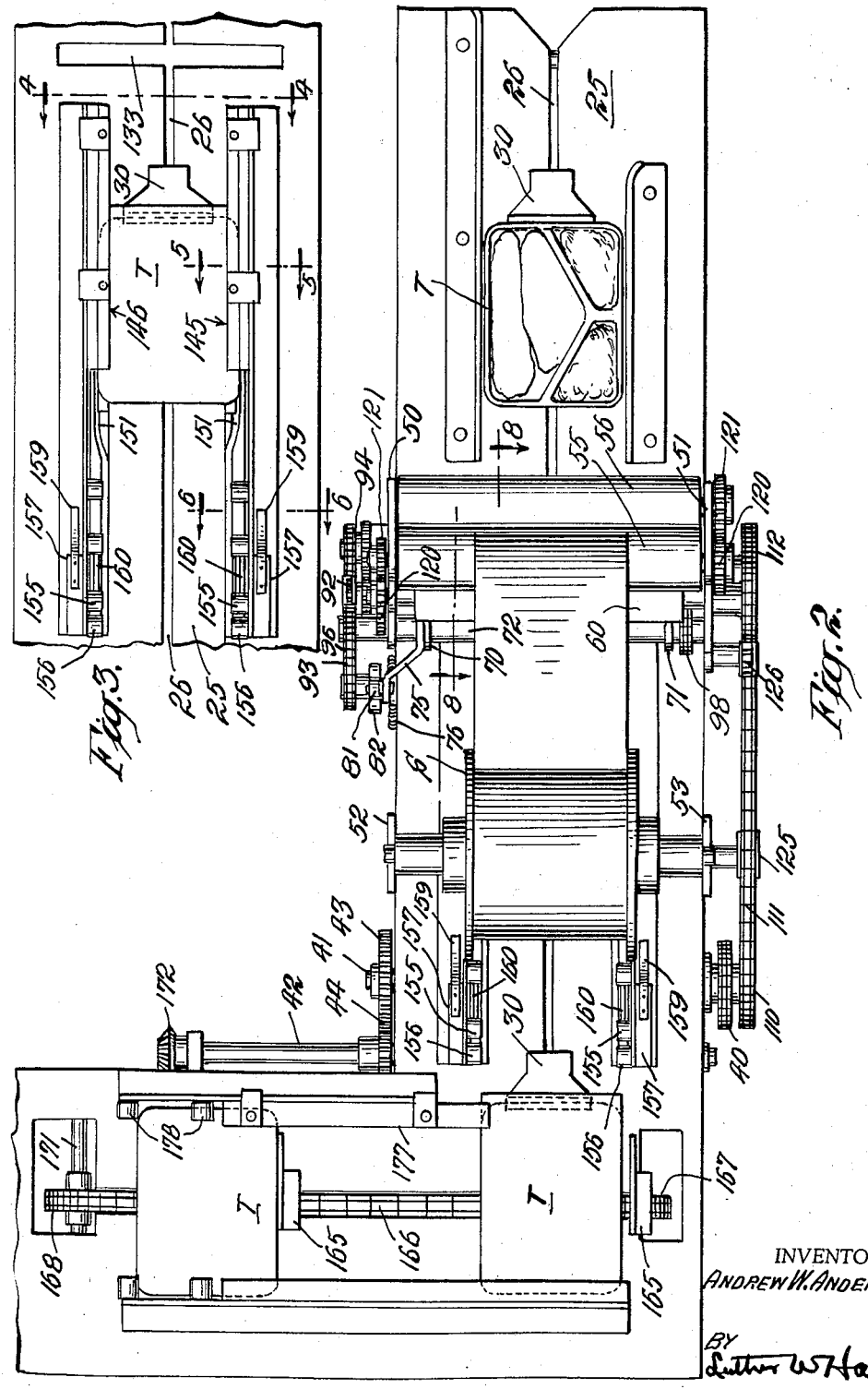
INVENTOR.
ANDREW W. ANDERSON
BY
Luther W Hawley
ATTORNEY

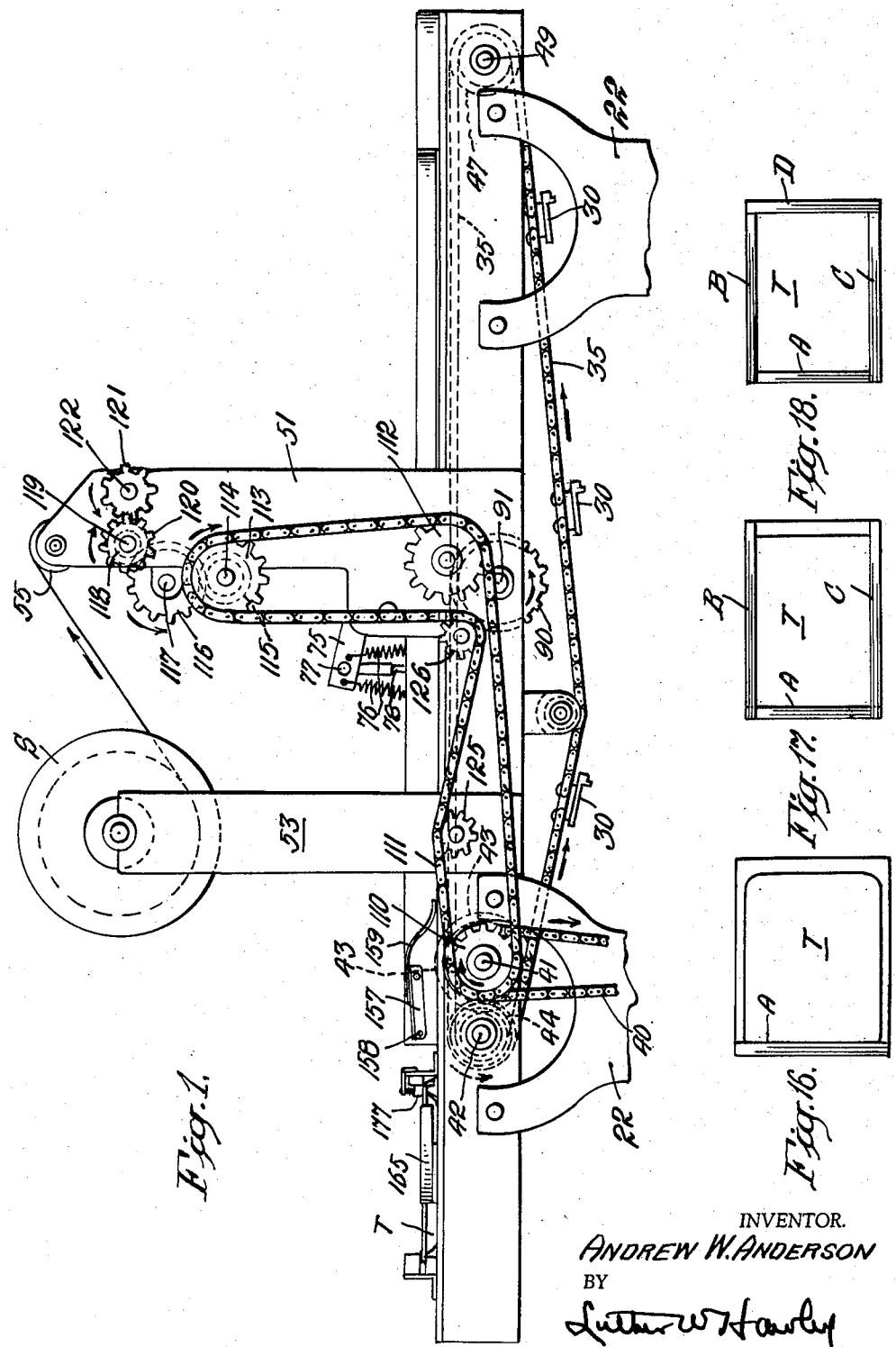

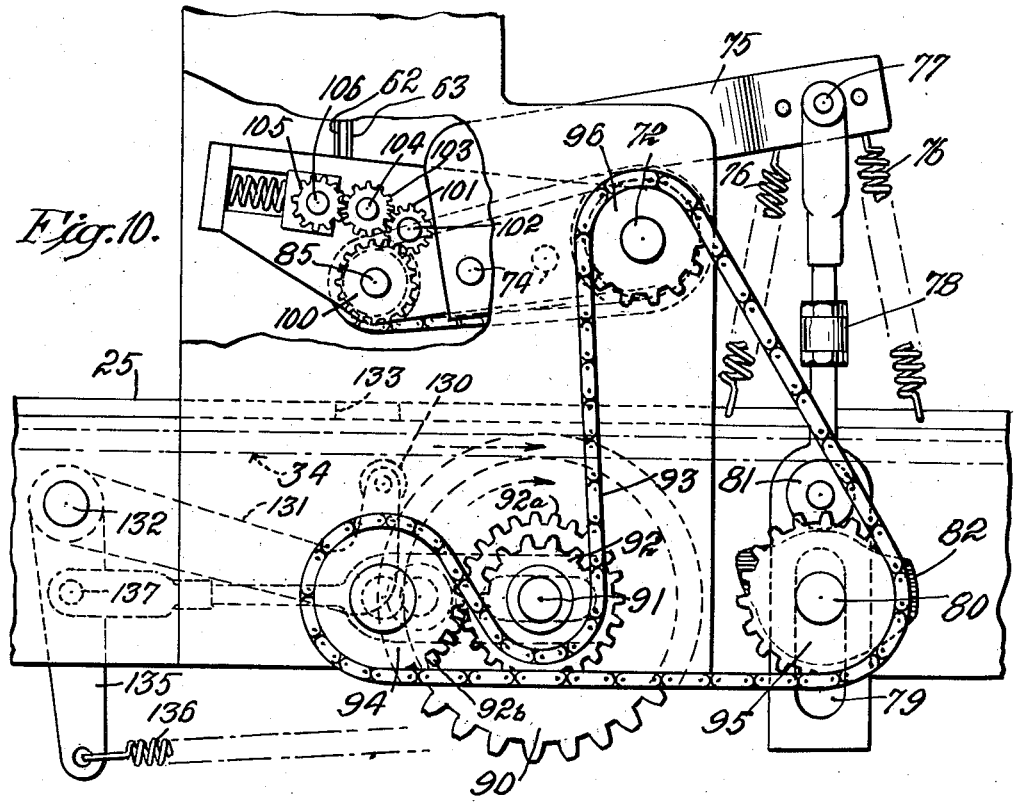

June 9, 1959
A. W. ANDERSON
2,889,675
MACHINE FOR COVERING CONTAINERS
Filed Oct. 9, 1957
6 Sheets-Sheet 4
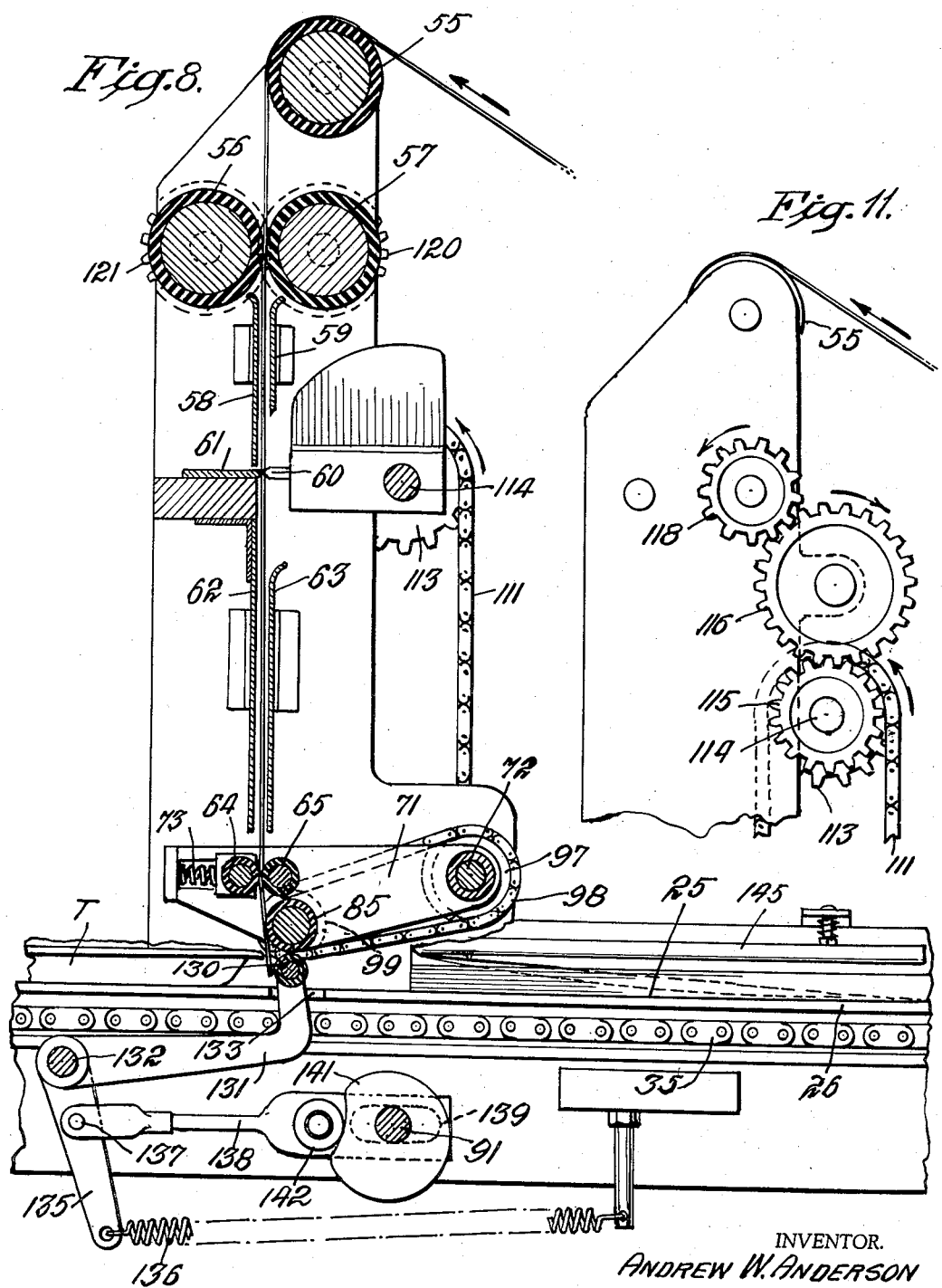
INVENTOR.
ANDREW W. ANDERSON
BY
ATTORNEY June 9, 1959  A. W. ANDERSON  2,889,675
MACHINE FOR COVERING CONTAINERS
Filed Oct. 9, 1957  6 Sheets-Sheet 5

INVENTOR.
ANDREW W. ANDERSON
BY
Luther W. Hawley
ATTORNEY

June 9, 1959 — A. W. ANDERSON — 2,889,675
MACHINE FOR COVERING CONTAINERS
Filed Oct. 9, 1957 — 6 Sheets-Sheet 6
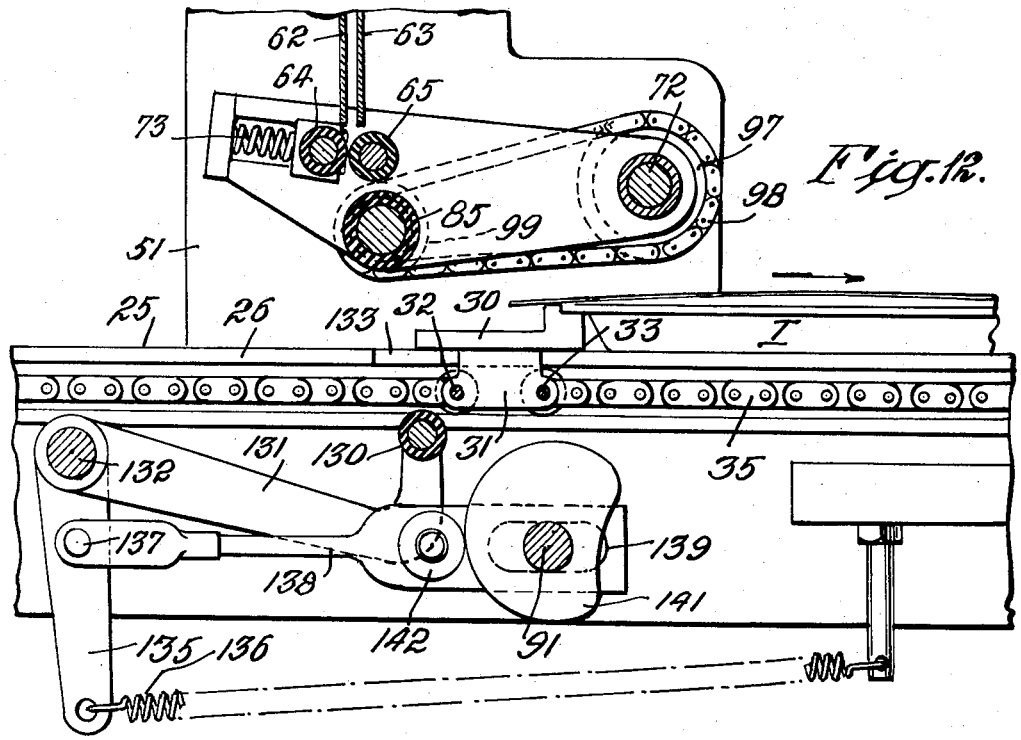
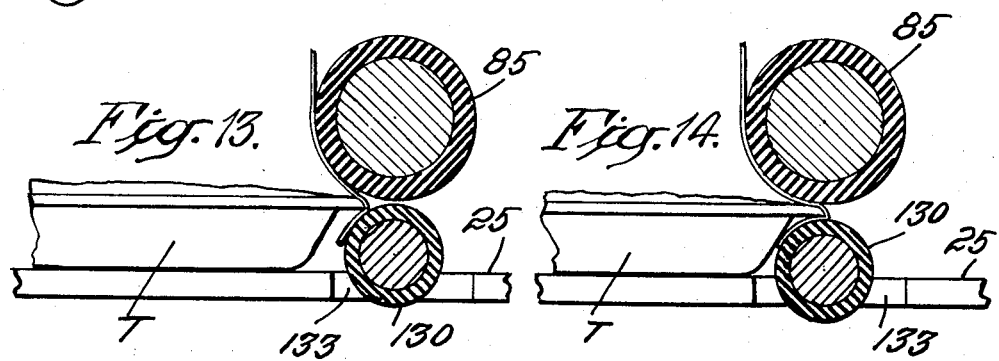
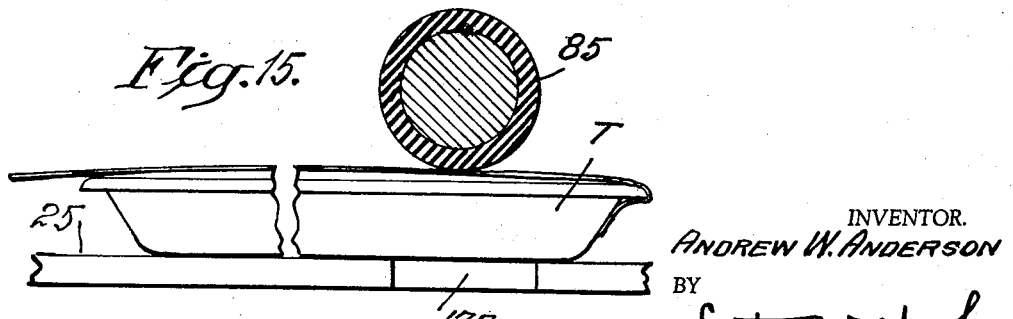
INVENTOR.
ANDREW W. ANDERSON
BY
Luther W. Hawley
ATTORNEY

United States Patent Office 2,889,675
Patented June 9, 1959

2,889,675

MACHINE FOR COVERING CONTAINERS

Andrew W. Anderson, Nutley, N.J., assignor to Scandia Packaging Machinery Company, a corporation of New Jersey Application October 9, 1957, Serial No. 689,218

10 Claims. (Cl. 53—220)

This invention relates to wrapping machines and more particularly to mechanism for positioning and securing a cover sheet over the top of an open, loaded tray.

At the present time, open trays are filled or loaded with food and are then covered by a flexible sheet of material, such as metal foil. This operation as now carried out requires the services of several operatives who manually fold the foil around and beneath the edges of the tray.

The foil should cover the food snugly but should not be pulled too tight since parts of the food, such, for instance, as chicken bones, may puncture the foil cover.

This invention has for its salient object to provide a simple and practical means for feeding and securing a sheet of flexible material over a loaded tray.

Another object of the invention is to provide means of the character described so worked out and so controlled that it will effectively and securely cover trays having loads of varying heights.

Further objects of the invention will appear from the following specification taken in connection with the drawings which form a part of this application, and in which—

Fig. 1 is a side elevational view of the machine constructed in accordance with the invention;

Fig. 2 is a top plan view of the machine shown in Fig. 1;

Fig. 3 is a plan view of a portion of the table on which the trays are fed and having at the sides thereof folding means for folding the projecting edges of the sheet around the longitudinal edges of the tray;

Fig. 4 is a transverse sectional elevation taken substantially on line 4—4 of Fig. 3, looking in the direction of the arrows;

Fig. 5 is a transverse sectional elevation taken substantially on line 5—5 of Fig. 3, looking in the direction of the arrows;

Fig. 6 is a sectional elevation taken substantially on line 6—6 of Fig. 3, looking in the direction of the arrows;

Fig. 7 is a sectional elevation taken substantially on line 7—7 of Fig. 6, looking in the direction of the arrows;

Fig. 8 is a vertical sectional elevation taken substantially on line 8—8 of Fig. 2, looking in the direction of the arrows;

Fig. 10 is an elevational view showing the driving connections for the roller which folds the advance end of the foil sheet around the advance end of the tray and for the bottom feed rollers which feed the sheet as the tray moves along the table;

Fig. 11 is a fragmentary elevational view showing the driving connection for the upper feed rollers;

Fig. 12 is an elevational view, partly in section, showing the feeding blocks which feed the trays along the table, the roller which folds the advance end of the sheet around the advance end of the tray, and the lower feed rollers;

Figs. 13, 14 and 15 are elevational views, partly in section, showing the operation of the fold roller in successive positions in which the advance end of the foil sheet is folded around the advance end of the tray; and Figs. 16, 17 and 18 are bottom plan views of the tray showing the successive folds made therein.

Figure 9:
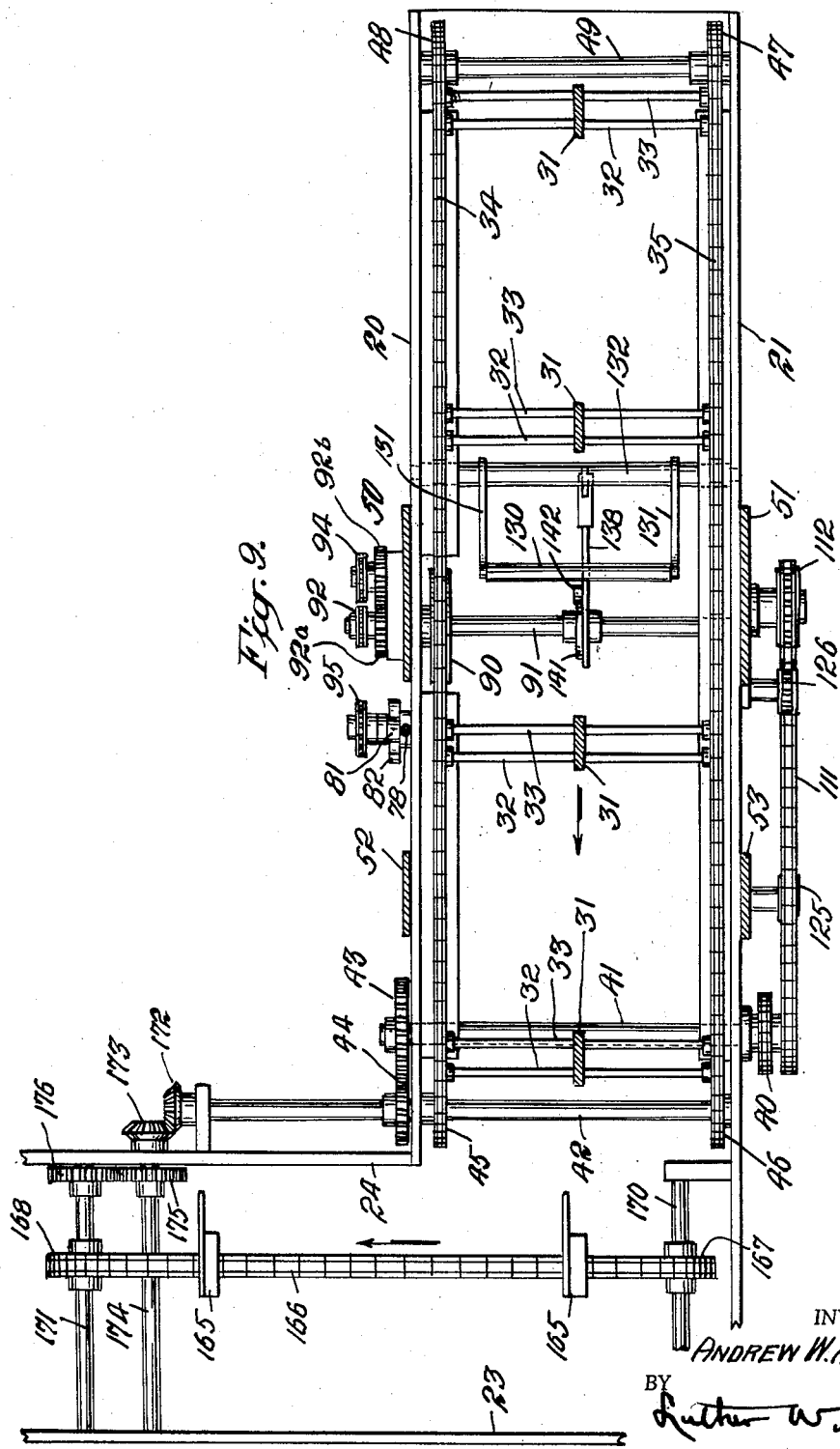
Fig. 9 is a horizontal sectional elevation showing in plan view the conveyor drives and other driving mechanism.

In the particular embodiment of the invention illustrated in the drawings, the machine comprises side plates 20 and 21 which are mounted on legs 22, and a right angle section of the machine comprising side plates 23 and 24 which are mounted on suitable supports not shown.

Between the side plates 20 and 21 is mounted a supporting table 25 having a longitudinal slot 26 extending throughout the length thereof.

The mechanism about to be described was designed to position and secure a sheet of flexible material such as metal foil, over the top of a loaded tray which is pushed along the platform 25. The trays are fed by feed plates or blocks 30 which are carried by upright plates 31 mounted on transverse rods 32 and 33 carried by feed chains 34 and 35 which are driven in a manner hereinafter described.

The plates 31 on which the feed blocks 30 are mounted extend upwardly through the slot 26 in the platform 25 and the blocks successively engage loaded trays such as that shown at T in Fig. 2 and feed the trays along the platform and beneath the sheet feeding mechanism in a manner hereinafter described.

The power for driving the various mechanisms in the machine is transmitted by a chain 40 from a suitable source of power to a shaft 41 mounted in the side plates 20 and 21. The shaft 41 is connected to a shaft 42 through gears 43 and 44 and the shaft 42 has sprockets 45 and 46 which drive the feed chains 34 and 35, these chains being mounted also on idler sprockets 47 and 48 carried by shaft 49.

Web and sheet feeding mechanism

The mechanism for feeding the web of flexible sheet material, such as metal foil, is mounted between upright frame members 50 and 51 carried by the side plates 20 and 21.

The supply roll S of sheet material is mounted in upright frame members 52 and 53 also secured to the side plates 20 and 21. From the supply roll the web is carried over an idler 55 mounted at the upper ends of the frame members 50 and 51 and from the idler web passes downwardly between a pair of feed rollers 56 and 57. From the feed rollers the web passes between a pair of guide plates 58 and 59 and is cut by a rotary knife 60 which coacts with a stationary knife 61. The sheet of material, after it has been cut, passes between guide plates 62 and 63 and thence through a pair of feed rollers 64 and 65 which are mounted between plates 70 and 71 which are pivoted on a shaft 72 mounted in the frame members 50 and 51. The feed roller 64 is spring pressed against the roller 65 by a spring 73.

Since the side plates 70 and 71 are pivoted on the shaft 72, the feed rollers are swung about the shaft 72 as an axis during the passage of a tray therebeneath, this being accomplished in the following manner.

The plate 70 has secured thereto, as by bolts 74, an arm 75 which is pulled in a clockwise direction by means of springs 76 secured to the side 20 of the machine frame. The arm 75 also has pivoted thereto at 77, a link or pitman 78, which is slotted as shown at 79 to receive a shaft 80. The link 78 has mounted thereon a roller 81 which engages a cam 82 mounted on the shaft 80. As the shaft 80 and cam 82 are rotated, the link 78 will transmit this motion to the arm 75 and will swing the plates 70 and 71 about their pivot on shaft 72, thus raising and lowering the feed rolls 64 and 65 and a roller 85 which is mounted below the feed roller 65.

Thus, as a tray is pushed beneath the sheet feeding mechanism, the lower end of the sheet will be pressed against the advance end of the tray T and as the tray is fed along the table 25 the feed rolls 64 and 65 will feed the sheet across the top of the tray and by reason of their vertical movement will provide for the load on the tray which may project to a varying extent above the rim of the tray.

The driving connections for the feed rolls are as follows. The chain 34 passes over a sprocket 90 mounted on a shaft 91 and drives this shaft. The shaft 91 has also mounted thereon an idler wheel 92. A gear 92a secured to the shaft 91 meshes with a gear 92b which drives sprocket 94 which drives the chain 93. The chain 93 passes beneath the sprocket wheel 92, over and around an idler sprocket 94, around a sprocket 95 mounted on the shaft 80, thus driving the cam 82, and around a sprocket 96 mounted on the shaft 72. Shaft 72 also has mounted thereon a sprocket wheel 97 which drives a chain 98, which in turn drives a sprocket wheel 99 on shaft 85. This shaft has also secured thereto a gear 100 which meshes with a gear 101 carried by a shaft 102, and gear 101 drives a gear 103 on shaft 104 on which the feed roll 65 is mounted. Gear 104 meshes with a gear 105 on the shaft 106 on which the feed roll 64 is mounted.

The upper feed rolls 56 and 57 and the knife shaft are driven in the following manner, attention being directed particularly to Fig. 1. In this figure it will be seen that the shaft 41 carries a sprocket 110 on which is mounted a chain 111 which passes around an idler 112 and around a sprocket 113 mounted on a shaft 114. Shaft 114 has also mounted thereon a gear 115 which meshes with a gear 116 on a spindle 117. The gear 116 meshes with a gear 118 on a shaft 119 on which the feed roll 57 is mounted. Shaft 119 also has mounted thereon a gear 120 which meshes with a gear 121 on a shaft 122 on which is mounted the feed roll 56. The chain 111 also passes around a pair of idlers 125 and 126.

As the tray is fed along the table and reaches a position beneath the feed rolls 64 and 65 and roller 85 and the lower end of the sheet being fed thereby is fed into the path of the tray, the roller 85 guides the end of the sheet and, as shown in Fig. 14, presses the sheet against the top of the tray. Then mechanism illustrated particularly in Figs. 8, 12, 13, 14 and 15 is brought into play to fold the lower end of the sheet of flexible metal foil around and beneath the advance rim of the tray.

*Mechanism for folding end of sheet around advance end of tray*

When the tray reaches this position, a roller 130 carried by arms 131 mounted on a shaft 132 is moved upwardly in the manner hereinafter described and passes through a transverse slot 133 in the table 25 to a position beneath the roll 85. In its upward position the roller 130 is disposed as shown in Fig. 8 adjacent the lower end of the sheet of flexible material. From the showing in Fig. 13 it will be seen that as the tray T advances, this lower end is folded by the roller 130 around the advance rim of the tray and, as shown in Fig. 14, beneath this rim and against the advance end of the body portion of the tray. When the roller or tube 130 has performed this function, the shaft or spindle 132 will be rotated in a clockwise direction to lower the roller 130, thus retracting it through the slot 133 and out of the path of movement of the trays. This is accomplished in the following manner.

Shaft 132 has secured thereto a downwardly extending arm 135, to the lower end of which is connected a spring 136. Intermediate its ends the arm 135 has pivoted thereto at 137, a link or pitman 138 having a slot 139 at the other end thereof through which extends the shaft 91. Shaft 91 has mounted thereon a cam 141 which engages a roller 142 carried by the link 138 and reciprocates the link as the shaft 91 is rotated in the manner hereinbefore described, as shown particularly in Fig. 10. As the link is reciprocated, the arms 131 will be raised and lowered to move the roller or tube 130 into operative and inoperative positions.

Figs. 16, 17 and 18 are bottom plan views showing the sequence of operations in folding the edges of the flexible sheet around and beneath the upper rim of the tray. As explained above, the initial fold A is formed in the manner shown in Figs. 12 to 15 inclusive, by raising the transverse tube or roller 130 and using this tube to fold the lower end of the sheet around the advance end of the tray and beneath the rim. Means is provided at the sides 20 and 21 of the frame for forming the side folds B and C shown in Fig. 18. After the sheet has been folded around the advance end of the tray and has been positioned over the top of the tray, the two projecting longitudinal edges of the sheet are folded around the edges of the tray in the manner shown in Figs. 4 to 7 inclusive.

*Mechanism for folding sides of sheet beneath rim of tray*

In Fig. 4 resiliently actuated pressers 145 and 146 press the sheet against the upper surface of the rim R of the tray T and the projecting edges 147 and 148 engage inclined guiding members 149 and 150 and guide these edges into slots 151 shown in Fig. 5. From the slots these edges are engaged by rollers 152 and the edges 147 and 148 are engaged by inclined surfaces 153 of blocks 154 and are pressed against the inclined outer surface of the body portion of the tray. A final pressure on the edge portions of the sheet is made by rollers 155 and 156 which are carried by arms 157 pivoted at 158, and the arms are swung in a clockwise direction by means of springs 159, it being understood that the structures shown in Figs. 5, 6 and 7 are provided at the two longitudinal edges of the sheet. Fig. 7 also shows an upwardly acting presser member or bar 160 which is pivoted at 161 and is pressed upwardly in an anti-clockwise direction by a spring 162. This bar presses upwardly on the under surface of the folded projecting portion 147 or 148, as the case may be.

After the folds A, B and C have been made, as shown in Fig. 18, the final fold D is made as the tray is moved transversely from the delivery end of the table 25 by means of pushers 165 carried by a conveyor chain 166 mounted on sprockets 167 and 168, which in turn are carried by spindles 170 and 171. The shaft 42 has on one end thereof a bevel gear 172, which meshes with a bevel gear 173 mounted on a shaft 174, which also has mounted thereon a gear 175 which meshes with a gear 176 on the shaft 171.

The side member 24 of the transverse table has mounted thereon folding mechanism similar to that shown in Figs. 4, 5 and 6 and indicated in Fig. 1 at 177. Fig. 2 shows rollers 178 which are similar to the rollers shown in Fig. 3.

In connection with the feeding means for feeding the web and sheet downwardly, it will be noted from the gearing and drives above described that the pick-up feed accomplished by the rolls 64 and 65 is more rapid than the feed accomplished by the upper rollers 56 and 57, thus placing the sheet under tension at the time that it is severed by the knife 60. Thus the sheet is held under control and is held in proper alignment.

From the foregoing description it will be seen that simple and practical mechanism has been provided for feeding a sheet of flexible metal foil downwardly into the path of an advancing tray, folding the advanced end of the sheet around the edge and beneath the rim of the tray, feeding the remaining portion of the sheet upwardly and over the food disposed in the tray, securing the longitudinal edges of the sheet beneath the longitudinal edges of the rim and, finally, folding and securing the remaining end of the sheet beneath and around the trailing end of the tray. This mechanism operates efficiently to cover the tray and the food thereon without placing the sheet under too great a tension since the feed rolls 64 and 65 are driven at a rate of speed corresponding to the rate of the advance movement of the tray and are raised as the sheet is positioned over the loaded tray.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. Container covering means comprising means for feeding rimmed containers, means for feeding a sheet of flexible material to a position in which the advance end of the sheet is disposed in the path of movement of a container, and means operable when the container engages the sheet end for folding said end around and beneath the advance rim of the container.

2. Container covering means comprising a support, means for feeding rimmed containers along said support, means for feeding a sheet of flexible material to a position in which the advance end of the sheet is disposed in the path of movement of a container, and means operable when the container engages the sheet end and movable upwardly through the support for folding said end around and beneath the advance rim of the container.

3. Container covering means comprising means for feeding rimmed contatiners, means for feeding a sheet of flexible material to a position in which the advance end of the sheet is disposed in the path of movement of a container, means operable when the container engages the sheet end for folding said end around and beneath the advance rim of the container, and means for feeding the sheet and disposing the sheet over the top of the container after the advance end of the sheet has been folded around the container rim and as the container advances in its feeding movement.

4. Container covering means comprising means for feeding rimmed containers, means for feeding a sheet of flexible material to a position in which the advance end of the sheet is disposed in the path of movement of a container, means operable when the container engages the sheet end for folding said end around and beneath the advance rim of the container, and vertically movable means for feeding the sheet and disposing the sheet over the top of the container after the advance end of the sheet has been folded around the container rim and as the container advances in its feeding movement.

5. Container covering means comprising means for feeding rimmed containers, means for feeding a sheet of flexible material to a position in which the advance end of the sheet is disposed in the path of movement of a container, means operable when the container engages the sheet end for folding said end around and beneath the advance rim of the container, means for feeding the sheet and disposing the sheet over the top of the container after the advance end of the sheet has been folded around the container rim and as the container advances in its feeding movement, and means for moving said sheet feeding means upwardly as the container passes therebeneath and downwardly as the rear end of the container passes under the feeding means.

6. Container covering means comprising means for feeding rimmed containers, means for feeding a sheet of flexible material to a position in which the advance end of the sheet is disposed in the path of movement of a container, and means movable into the path of feed of the container for engaging and folding the advance end of the sheet around and beneath the rim of the container.

7. Container covering means comprising means for feeding rimmed containers, means for feeding a sheet of flexible material to a position in which the advance end of the sheet isd isposed in the path of movement of a container, and means movable upwardly into the path of feed of the container for engaging and folding the advance end of the sheet around and beneath the rim of the container.

8. Container covering means comprising means for feeding rimmed containers, means for feeding a sheet of flexible material to a position in which the advance end of the sheet is disposed in the path of movement of a container, means operable when the container engages the sheet end for folding said end around and beneath the advance rim of the container, and means for feeding the sheet at the same rate as the rate of movement of the container and disposing the sheet over the top of the container after the advance end of the sheet has been folded around the container rim and as the container advances in its feeding movement.

9. Container covering means comprising means for feeding rimmed containers, means for feeding a sheet of flexible material to a position in which the advance end of the sheet is disposed in the path of movement of a container, means operable when the container engages the sheet end for folding said end around and beneath the advance rim of the container, and subsequently acting means for folding laterally projecting edges of the sheet around and beneath longitudinal edges of the container and for folding the rear edge of the sheet around and beneath the rear edge of the container.

10. Container covering means comprising a support, means for feeding rimmed containers along said support, means for feeding a sheet of flexible material to a position in which the advance end of the sheet is disposed in the path of movement of a container, means for pressing the sheet against the top of the container rim, and means operable when the container engages the sheet end and movable upwardly through the support for folding said end around and beneath the advance rim of the container.

References Cited in the file of this patent

UNITED STATES PATENTS 2,350,244     Malhiot ---------------- May 30, 1944